(12) United States Patent
Gohman et al.

(10) Patent No.: US 7,259,912 B2
(45) Date of Patent: Aug. 21, 2007

(54) FRESNEL LENS HAVING REDUCED DISTORTIONS

(75) Inventors: Jeffrey A. Gohman, Hillsboro, OR (US); T. Scott Engle, Tualatin, OR (US); David Slobodin, Lake Oswego, OR (US)

(73) Assignee: InFocus Corporation, Wilsonville, OR (US)

( * ) Notice: Subject to any disclaimer, the term of this patent is extended or adjusted under 35 U.S.C. 154(b) by 15 days.

(21) Appl. No.: 10/754,092

(22) Filed: Jan. 6, 2004

(65) Prior Publication Data

US 2005/0146687 A1   Jul. 7, 2005

(51) Int. Cl.
- G03B 21/60 (2006.01)
- G03B 21/56 (2006.01)
- G03B 21/22 (2006.01)
- G03B 21/28 (2006.01)

(52) U.S. Cl. .................. 359/460; 359/449; 359/450; 359/456; 359/457; 353/77

(58) Field of Classification Search ............ 353/77–78; 359/449–450, 454–457, 460
See application file for complete search history.

(56) References Cited

U.S. PATENT DOCUMENTS

| | | | |
|---|---|---|---|
| 3,485,165 A * | 12/1969 | Hughes | 101/127.1 |
| 3,712,707 A | 1/1973 | Henkes Jr. | |
| 4,571,864 A * | 2/1986 | Bopp | 38/102.5 |
| 4,674,836 A | 6/1987 | Yata et al. | 359/457 |
| 4,729,631 A | 3/1988 | Takahashi et al. | 359/456 |
| 4,730,897 A | 3/1988 | McKechnie et al. | |
| 4,880,292 A | 11/1989 | Kageyama et al. | 359/457 |
| 4,921,330 A * | 5/1990 | Takahashi et al. | 359/457 |
| 4,927,248 A | 5/1990 | Sakakibara et al. | |
| 4,936,657 A | 6/1990 | Tejima et al. | 349/7 |
| 4,979,801 A | 12/1990 | Park | |
| RE33,795 E | 1/1992 | Ogino | |
| 5,100,222 A | 3/1992 | Minoura et al. | 359/455 |
| 5,302,983 A | 4/1994 | Sato et al. | 353/69 |
| 5,422,691 A | 6/1995 | Ninomiya et al. | 353/69 |
| 5,442,413 A | 8/1995 | Tejima et al. | 353/69 |
| 5,442,484 A | 8/1995 | Shikawa | |
| 5,489,940 A | 2/1996 | Richardson et al. | 348/315 |
| 5,495,306 A | 2/1996 | Shibazaki | 353/99 |

(Continued)

FOREIGN PATENT DOCUMENTS

JP   2989947   10/1999

OTHER PUBLICATIONS

H. Kanayama et al., "A New LC Rear-Projection Display Based on the Aspherical Mirror Projection System," IDW, 2000, pp. 1041-1044, Sanyo Electric Co., Ltd., Osaka Japan.

(Continued)

*Primary Examiner*—W. B. Perkey
*Assistant Examiner*—Magda Cruz
(74) *Attorney, Agent, or Firm*—Alleman Hall McCoy Russell & Tuttle LLP

(57) ABSTRACT

A display device for displaying images in a rear projection display device is provided. The display device may include, amongst other structure, a screen including a lens portion and a frame portion. A tensioner may be operatively associated with the screen and may be adapted to adjust the frame portion to maintain a predetermined tautness in the lens portion.

21 Claims, 18 Drawing Sheets

U.S. PATENT DOCUMENTS

| | | | |
|---|---|---|---|
| 5,699,131 A * | 12/1997 | Aoki et al. | 348/832 |
| 5,710,668 A | 1/1998 | Gohman et al. | 359/634 |
| 5,716,118 A | 2/1998 | Sato et al. | 353/98 |
| 5,724,195 A | 3/1998 | Enomoto et al. | 359/752 |
| 5,760,973 A | 6/1998 | Kawamura | 359/753 |
| 5,796,528 A | 8/1998 | Mihara | 359/753 |
| 5,805,359 A | 9/1998 | Yamanashi | 359/753 |
| 5,818,639 A * | 10/1998 | Furuya | 359/455 |
| 5,820,240 A | 10/1998 | Ohzawa | 353/70 |
| 5,833,339 A | 11/1998 | Sarayeddine | 353/20 |
| 5,870,234 A | 2/1999 | Ebbesmeier nee Schitthof | 359/752 |
| 5,923,479 A | 7/1999 | Nagata | 359/740 |
| 5,999,332 A | 12/1999 | Ohno | 359/692 |
| 6,016,229 A | 1/2000 | Suzuki | 359/784 |
| 6,018,425 A | 1/2000 | Nakabayashi et al. | 359/753 |
| 6,038,085 A | 3/2000 | Nakazawa | 359/753 |
| 6,046,859 A | 4/2000 | Raj | 359/649 |
| 6,052,226 A | 4/2000 | Takahashi | |
| 6,053,615 A | 4/2000 | Peterson et al. | 353/20 |
| 6,081,380 A | 6/2000 | Ohshima et al. | 359/599 |
| 6,084,707 A * | 7/2000 | Maruyama et al. | 359/460 |
| 6,088,172 A | 7/2000 | Sato | 359/770 |
| 6,111,701 A | 8/2000 | Brown | 359/637 |
| 6,123,425 A | 9/2000 | Ohzawa | 353/69 |
| 6,129,552 A * | 10/2000 | Deshoux et al. | 434/226 |
| 6,137,638 A | 10/2000 | Yamagishi et al. | 359/682 |
| 6,144,503 A | 11/2000 | Sugano | |
| 6,147,812 A | 11/2000 | Narimatsu et al. | 359/691 |
| 6,188,523 B1 | 2/2001 | Choi | |
| 6,201,647 B1 | 3/2001 | Ohzawa | 359/631 |
| 6,236,511 B1 | 5/2001 | Brown | 359/634 |
| 6,273,338 B1 | 8/2001 | White | 235/462.42 |
| 6,299,313 B1 | 10/2001 | Hirata et al. | 353/54 |
| 6,301,058 B2 | 10/2001 | Nagahara | 359/650 |
| 6,307,675 B1 | 10/2001 | Abe et al. | |
| 6,348,993 B1 * | 2/2002 | Hori | 359/443 |
| 6,353,509 B1 | 3/2002 | Nakazawa | 359/761 |
| 6,366,400 B1 | 4/2002 | Ohzawa | 359/434 |
| 6,384,987 B1 | 5/2002 | Sensui | 359/753 |
| 6,396,641 B2 | 5/2002 | Hirata et al. | 359/649 |
| 6,400,504 B2 | 6/2002 | Miyata | |
| 6,406,150 B1 | 6/2002 | Burstyn | 353/69 |
| 6,407,859 B1 | 6/2002 | Hennen et al. | |
| 6,407,860 B1 | 6/2002 | Funazaki et al. | 359/457 |
| 6,416,181 B1 | 7/2002 | Kessler et al. | |
| 6,417,966 B1 | 7/2002 | Moshrefzadeh et al. | |
| 6,419,365 B1 | 7/2002 | Potekev et al. | 353/98 |
| 6,471,359 B1 | 10/2002 | Kim et al. | |
| 6,473,236 B2 | 10/2002 | Tadic-Galeb et al. | |
| 6,485,145 B1 | 11/2002 | Cotton et al. | |
| 6,493,032 B1 | 12/2002 | Wallerstein et al. | |
| 6,513,935 B2 | 2/2003 | Ogawa | 353/37 |
| 6,561,649 B1 | 5/2003 | Burstyn | 353/8 |
| 6,624,952 B2 | 9/2003 | Kuwa et al. | |
| 6,626,541 B2 | 9/2003 | Sunaga | |
| 6,652,104 B2 | 11/2003 | Nishida et al. | |
| 6,718,668 B2 * | 4/2004 | Cozzilino | 40/604 |
| 6,752,500 B1 | 6/2004 | Yoshii et al. | |
| 6,768,594 B2 | 7/2004 | Imafuku et al. | 359/649 |
| 6,788,460 B2 | 9/2004 | Knox et al. | |
| 6,804,055 B2 | 10/2004 | Peterson et al. | |
| 6,808,271 B1 | 10/2004 | Kurematsu | |
| 6,813,094 B2 | 11/2004 | Kaminsky et al. | |
| 6,853,493 B2 | 2/2005 | Kreitzer | |
| 6,877,862 B2 | 4/2005 | Fukunaga et al. | |
| 6,880,934 B2 | 4/2005 | Lee | |
| 6,883,920 B2 | 4/2005 | Chen | |
| 2002/0008853 A1 | 1/2002 | Sunaga | 353/69 |
| 2002/0044263 A1 | 4/2002 | Takeuchi | 353/69 |
| 2002/0122249 A1 * | 9/2002 | Kobayashi et al. | 359/443 |
| 2003/0025885 A1 | 2/2003 | Cotton et al. | 353/69 |
| 2003/0038999 A1 | 2/2003 | Knox et al. | |
| 2003/0053206 A1 | 3/2003 | Togino | |
| 2003/0169513 A1 | 9/2003 | Knox et al. | |
| 2003/0231261 A1 | 12/2003 | Bassi et al. | 348/745 |
| 2004/0001254 A1 | 1/2004 | Shimizu | 359/449 |
| 2004/0085637 A1 * | 5/2004 | Ikari et al. | 359/457 |
| 2004/0227990 A1 | 11/2004 | Peterson et al. | |

OTHER PUBLICATIONS

J. Ouellette, "Digital Displays with Micromirror Devices," American Institute of Physics, Jun. 1997, pp. 9-11.

J. Shinozaki, et al. 15.3: A 50-in. Ultra-Slim Liquid-Crystal Rear Projector, SID 92 Digest, 1992, pp. 273-276, Seiko Epson Corp., Tokyo, Japan.

* cited by examiner

FRESNEL LENS HAVING REDUCED DISTORTIONS

BACKGROUND

In order to provide a television with a screen size greater than approximately 40 inches a display device other than a direct view cathode ray tube (CRT) is typically used. As the screen size of a CRT increases, so too does the depth. It is generally accepted that for screen sizes greater than 40 inches direct view CRTs are no longer practical. Three alternatives exist for large screen (>40 inch screen size) displays: projection displays, plasma displays, and Liquid Crystal Displays (LCDs).

Current plasma and LCD displays are much more expensive than projection displays. Plasma and LCD displays are generally thin enough to mount on a wall, but can be heavy enough that mounting can be difficult. For example, current 42-inch plasma displays can weigh 80 pounds or more and 60-inch plasma displays can weigh 150 pounds or more. One advantage of plasma and LCD displays over current projection displays is that they are typically much thinner than current projection displays having the same screen size.

Projection displays, specifically rear projection displays, are typically more cost-effective then plasma displays. Projection displays may also consume too much space in a room to provide a practical solution for large screen needs. For example, typical 60-inch rear projection displays are 24 inches thick and can weigh 200 to 300 pounds.

FIG. 1 illustrates a prior art rear projection display device. In general, display device 100 includes optical engine 140, projection lens 130, back plate mirror 120 and screen 110. Optical engine 140 generates an image to be projected on screen 110. Projection lens 130 projects the image from optical engine 140 on to back plate mirror 120, which reflects the image to screen 110. The size of display device 100 is proportional to the size of the image to be displayed on screen 110. Thus, for large screen sizes (e.g., >60 inches), the overall size of display device 100 can be very large.

Fresnel lenses may be used to direct a projected image toward a viewer. Conventional rear projection display devices are thick because of surface reflections from the Fresnel surface. As the angle of incidence increases (on the flat side of the Fresnel) the amount of light that is reflected from the air-plastic interface also increases, reducing image uniformity. A person of ordinary skill in the art is familiar with calculating Fresnel surface reflections. The dimensions and arrangement of the surfaces in a Fresnel lens determines the angles at which the light will exit. Thus, any distortion to the shape of a Fresnel lens will distort the appearance of an image leaving the lens. Screen flex distortion is a type of distortion to the shape of a Fresnel lens. Screen flex distortion refers to distortion caused by pressure applied to the surface of a Fresnel lens that deforms the shape of the lens.

A Fresnel lens may also be distorted by the way it is mounted into a cabinet or otherwise implemented in a display device. Typically, a Fresnel lens is made of a thin sheet of flexible material. The thinness and the flexibility make the Fresnel lens difficult to handle and more difficult to maintain in a desired orientation, such as the vertical and flat orientation of the screen 110 of FIG. 1. The thin sheet of material comprising a Fresnel lens may be attached at a number of points to a mount in a rear projection display device to maintain the proper orientation. However, the tension in the Fresnel lens near the mounting connection points is typically greater than the tension in, for example, the center of the Fresnel lens. The uneven tension in Fresnel lens 120 may distort the shape of the lens and the image leaving the lens.

In some rear projection display devices, screen 110 may include both a Fresnel lens and a diffusion screen. However, both the Fresnel lens and the diffusion screen may be made of flexible materials. In these embodiments, the Fresnel lens and the diffusion screen both need structural support. Moreover, when the Fresnel lens is positioned adjacent to the diffusion screen, pressure applied to the surface of the diffusion screen may be transmitted to the associated Fresnel lens causing screen flex distortion.

To prevent screen flex distortion caused by pressure transmitted via a diffusion screen, some rear projection systems implementing Fresnel lenses, include an outer screen. The outer screen is separated from the diffusion screen by a distance that is sufficient to prevent contact between the screens when reasonable pressure is applied to the outer screen.

The pressure on, and deflection of, the outer screen does not cause screen flex distortion. However, the separation of the outer screen may cause parallax for users viewing the image on an angle. This is especially problematic when the outer screen is a touch screen, writing screen, or other screen configured for interactive input.

SUMMARY

A display device for displaying images in a rear projection display device is provided. The display device may include, amongst other structure, a screen including a lens portion and a frame portion. A tensioner may be operatively associated with the screen and may be adapted to adjust the frame portion to maintain a predetermined tautness in the lens portion.

DETAILED DESCRIPTION

An ultra-thin rear projection display system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The ultra-thin rear projection display device described herein includes a wide-angle lens system and one or more planar mirrors that are parallel to a screen on which an image is to be displayed. In one embodiment, the screen has multiple groove angles to provide better illumination than screens with a single groove angle.

As described in greater detail below, the screen can be a Fresnel lens having one or more groove angles. However, many other objects can operate as a screen for purposes of displaying an image. In general, any object that diffuses light can be used as a screen. For example, a wall, water or fog can be used as a screen.

Figure 1:
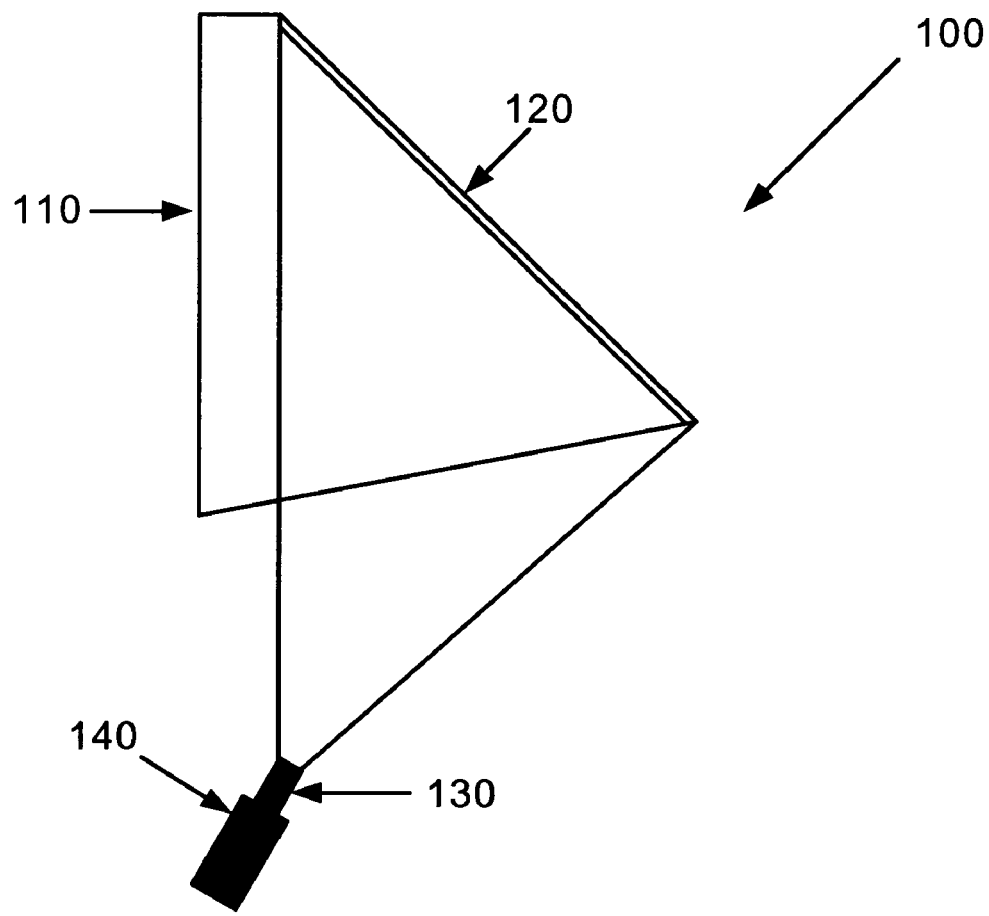
FIG. 1 illustrates a prior art rear projection display device.
Figure 2:
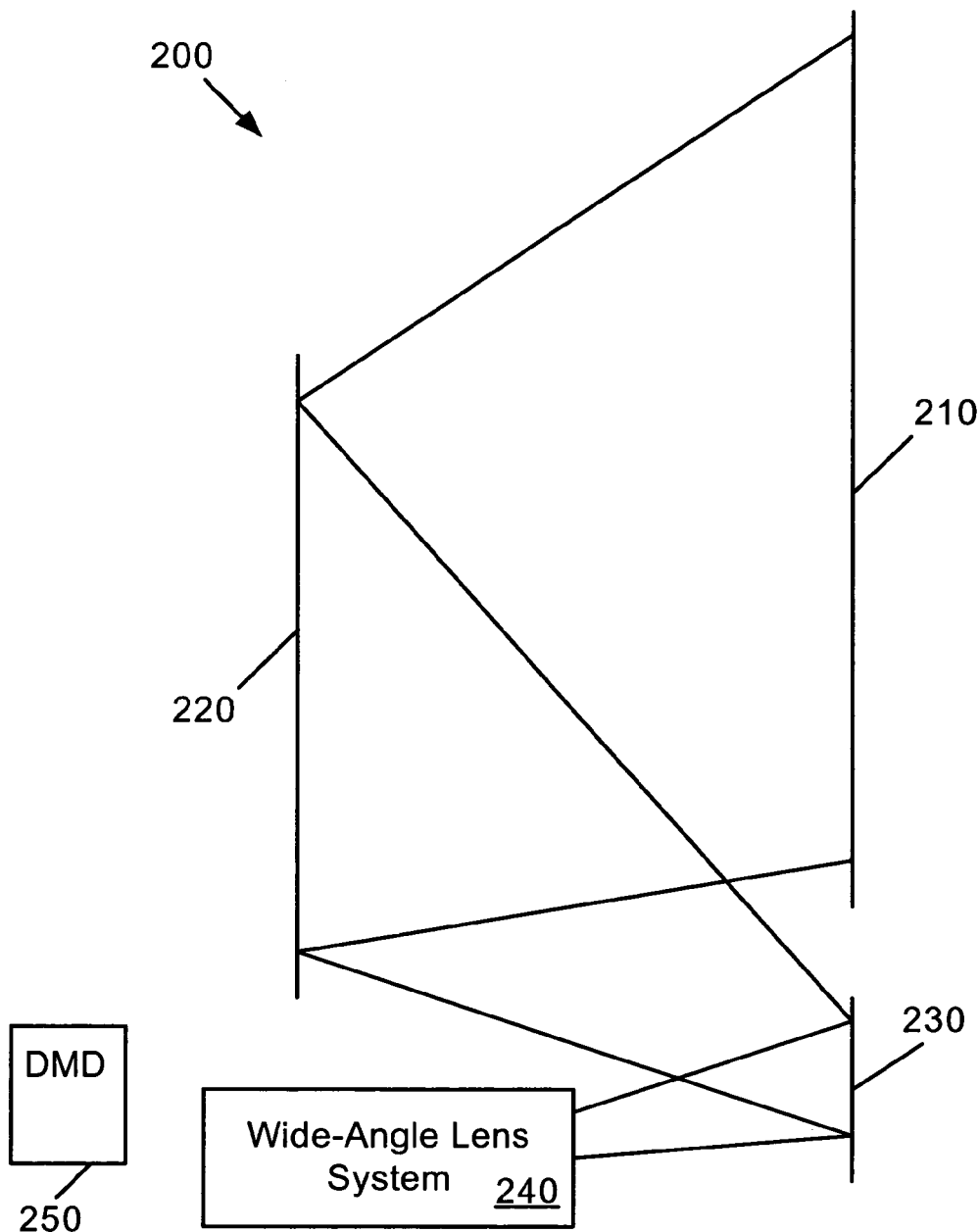
FIG. 2 illustrates an embodiment of an ultra-thin rear projection display device with planar mirrors parallel to a screen.

FIG. 2 illustrates one embodiment of an ultra-thin rear projection display device with planar mirrors parallel to a screen. Use of planar mirrors parallel to the screen as well as a wide angle projection lens having an optic axis that is perpendicular to the mirrors and the screen allows the ultra-thin rear projection display device to be thinner and simpler than prior art rear projection display devices. For example, an ultra-thin rear projection display device as described herein that is less than 7 inches thick can provide a 60-inch image.

In one embodiment, ultra-thin rear projection display device 200 includes screen 210, back plate mirror 220, intermediate mirror 230, lens system 240 and digital micromirror device (DMD) 250. Other components, for example, image generating components are not illustrated for reasons of simplicity of description. An image can be provided to DMD 250 in any manner known in the art. DMD 250 selectively reflects light from a light source (not shown in FIG. 2) to lens system 240. Any type of imaging device known in the art may be used in rear projection display device 200.

Other types of devices (e.g., microelectromechanical systems (MEMS), grating light valve (GLV), liquid crystal display (LCD), liquid crystal on silicon (LCOS)) can be used to provide an image to lens system 240. In one embodiment, the mirrors may be substantially parallel to the screen, which implies an alignment error of +/−10°. In one embodiment, the optic axis of the wide-angle lens system may be substantially perpendicular to the screen, which also implies an alignment error of +/−10°.

In one embodiment, DMD 250 is offset from the optic axis of lens system 240 such that only a portion (e.g., 50%, 60%, 40%) of the available lens field is used. The image from DMD 250 is projected by lens system 240 in the upper portion of the lens field to intermediate mirror 230. The image is then reflected to back plate mirror 220 and finally to screen 210.

In an alternative embodiment, the image from DMD 250 is projected by lens system 240 in the lower portion of the lens field to intermediate mirror 230. In such an embodiment, wide-angle lens system 240 may be, at least partly, above intermediate mirror 230. Intermediate mirror 230, in turn, may be, at least partly above back plate mirror 220. The image is then reflected to back plate mirror 220 and finally to screen 210.

In order to project an image as described, lens system 240 is a very wide-angle lens system. In one embodiment, lens system 240 has a field angle of 152° or more; however, other lenses can be used. In general, the wider the angle of lens system 240, the thinner display device 200 can be made. Description of a suitable wide-angle lens system is described in U.S. patent application Ser. No. 10/222,050, entitled "Wide Angle Lens System Having Distorted Intermediate Image," filed on Aug. 16, 2002, and application Ser. No. 10/222,083, which was filed on Aug. 16, 2002, both of which are hereby incorporated by reference for all purposes.

Intermediate mirror 230 reflects the image to back plate mirror 220, which reflects the image to screen 210. In one embodiment, screen 210 is a Fresnel lens. Back plate mirror 220 is also a planar mirror and is parallel to screen 210 and perpendicular to the optic axis of lens system 240. Because the optic axis of lens system 240 is perpendicular to intermediate mirror 230 and both intermediate mirror 230 and back plate mirror 220 are planar and parallel to screen 210, the distortion caused by angled lenses and aspherical mirrors is absent in display device 200. This simplifies the design of display device 200 and reduces the cost and complexity of manufacturing.

Figure 3A:
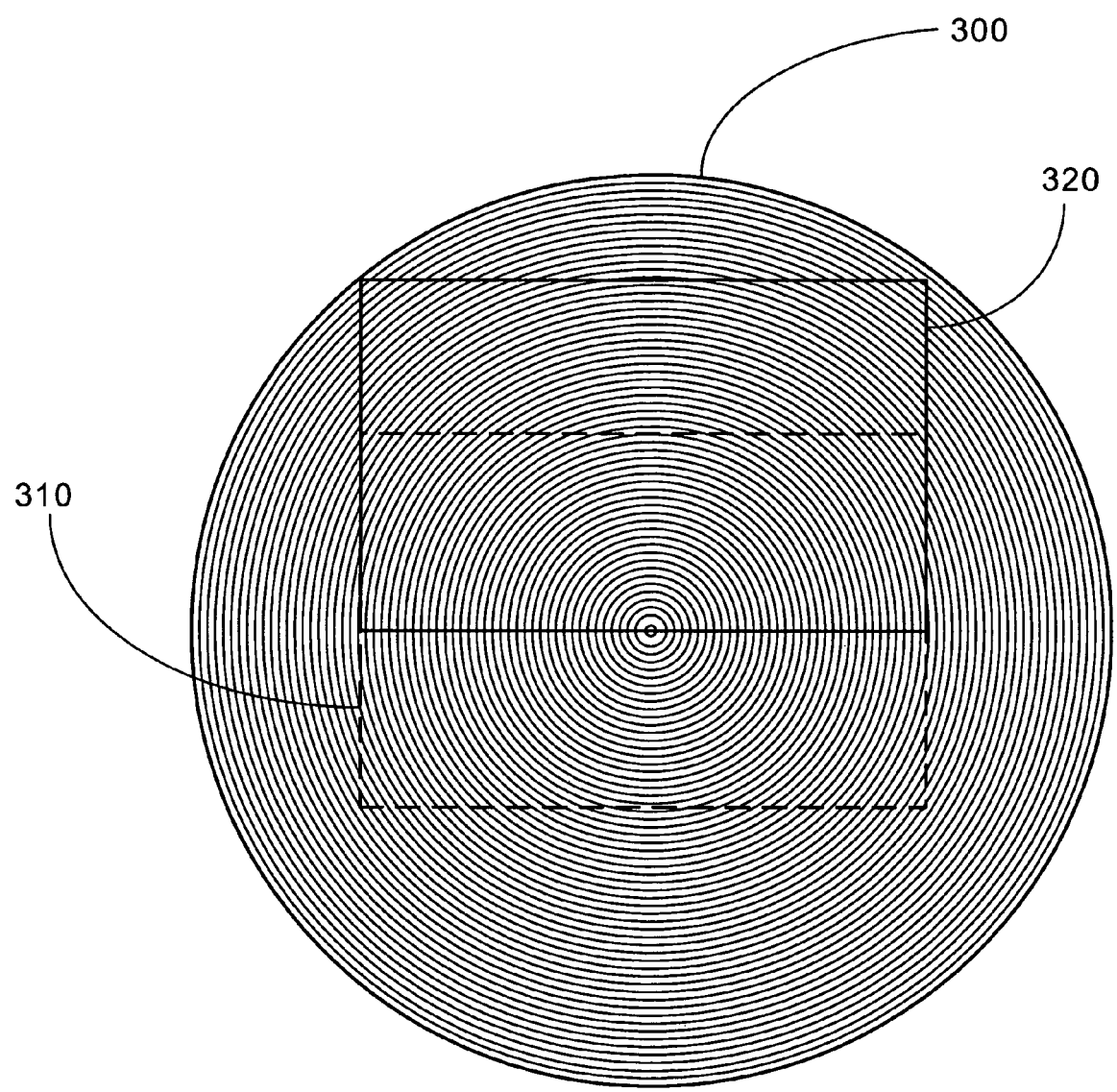
FIG. 3a illustrates a Fresnel lens with outlines of sections to be used for rear projection screens.

FIG. 3a illustrates a Fresnel lens with outlines of sections to be used for rear projection screens. FIG. 3a provides a conceptual illustration of the sections of a Fresnel lens that can be used for various rear projection display devices. The Fresnel lens can be described with two angles. The face angle is defined as the angle of the surface of each individual groove through which light passes as it enters or, in the case of some refractive designs, exits the Fresnel lens relative to the optic axis of the lens. The groove angle is the angle formed between the input face and the reflection face, or in the case of a refractive lens between the optical face of the groove and the non-optical face. Face angles and groove angles are more fully discussed below with reference to FIG. 7.

In one embodiment, Fresnel lens 300 can have many concentric grooves having one or more predetermined groove angles. Techniques for manufacturing and using Fresnel lenses having a single groove angle are known in the art. In a rear projection display device in which the full lens field of the projection lens system is used, a center portion 310 of Fresnel lens 300 is used for the lens of the display device.

Dashed rectangle 310 provides an indication of a screen made from the center portion of Fresnel lens 300. The size and shape of the portion of the lens to be used corresponds to the size and shape of the screen of the display device. For traditional rear projection displays, the center of section 310 to be used for a screen is the center of Fresnel lens 300.

When using an offset DMD (or other device) so that only a portion of the projection lens field is used, the section of Fresnel lens 300 used for a screen is correspondingly offset from the center of Fresnel lens 300. For example, if the top half of the projection lens field is used, the bottom edge of screen portion 320 passes through the center of Fresnel lens 300.

Figure 3B:
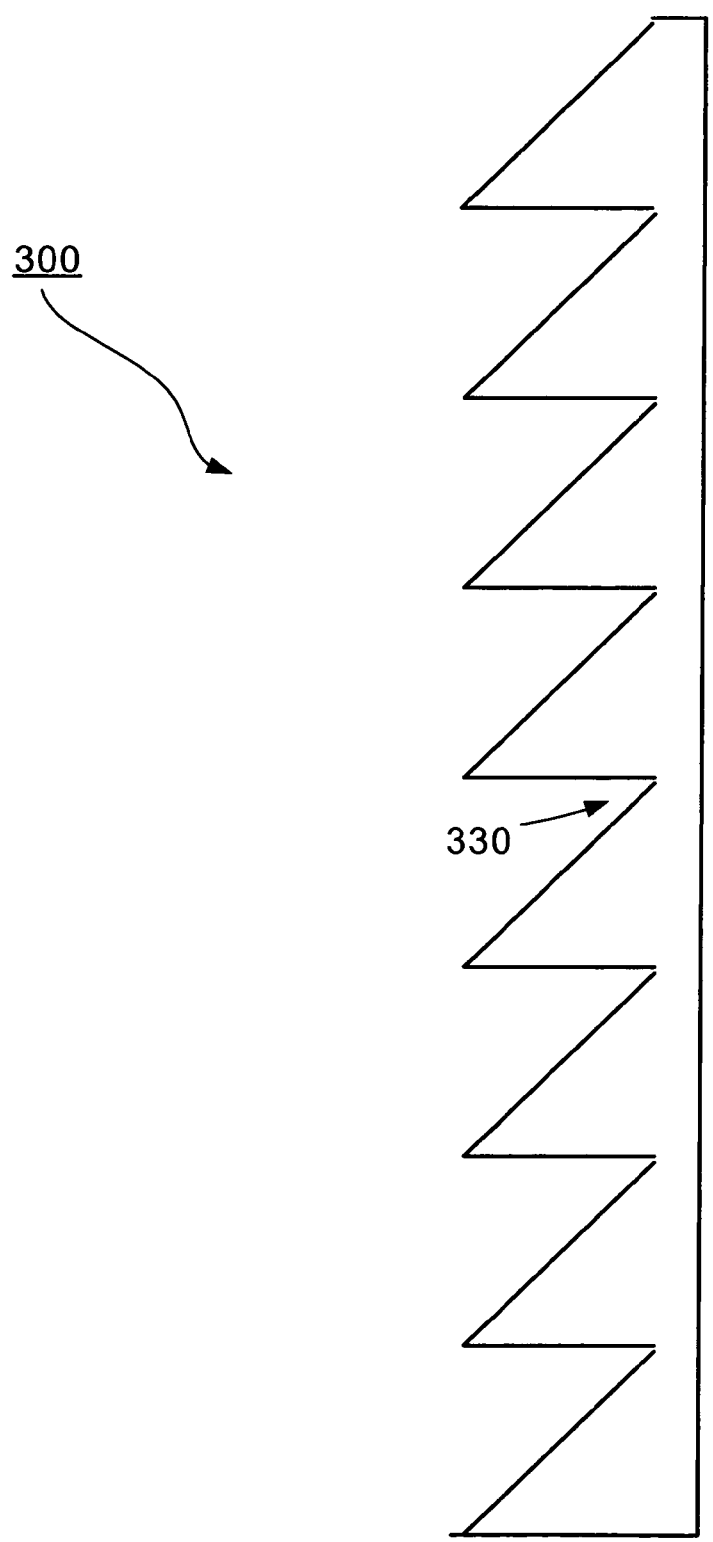
FIG. 3b illustrates a cross-sectional profile view of a Fresnel lens having a groove angle of 39°.

FIG. 3*b* illustrates a cross-sectional profile view of a Fresnel lens 300 having a groove angle 330 of 39°. The lens of FIG. 3*b* can be used with, for example, the display system of FIG. 2. When used with a display system as illustrated in FIG. 2 with an offset as described with respect to FIG. 3*a*, the groove angle of 39° provides a balance between diamond cutter structural integrity and lens performance.

As the groove angle increases, the image projected to the bottom center of lens 300 becomes dark because rays pass through the lens without being reflected from the intended total internal reflection (TIR) surface on the exterior of the groove. As the groove angle decreases, the image projected to the top corners of lens 300 become dark because reflected rays are directed down and away from the viewer. Also, as the groove angle decreases, the tool used to manufacture lens 300 can become too weak to work effectively.

Figure 4A:
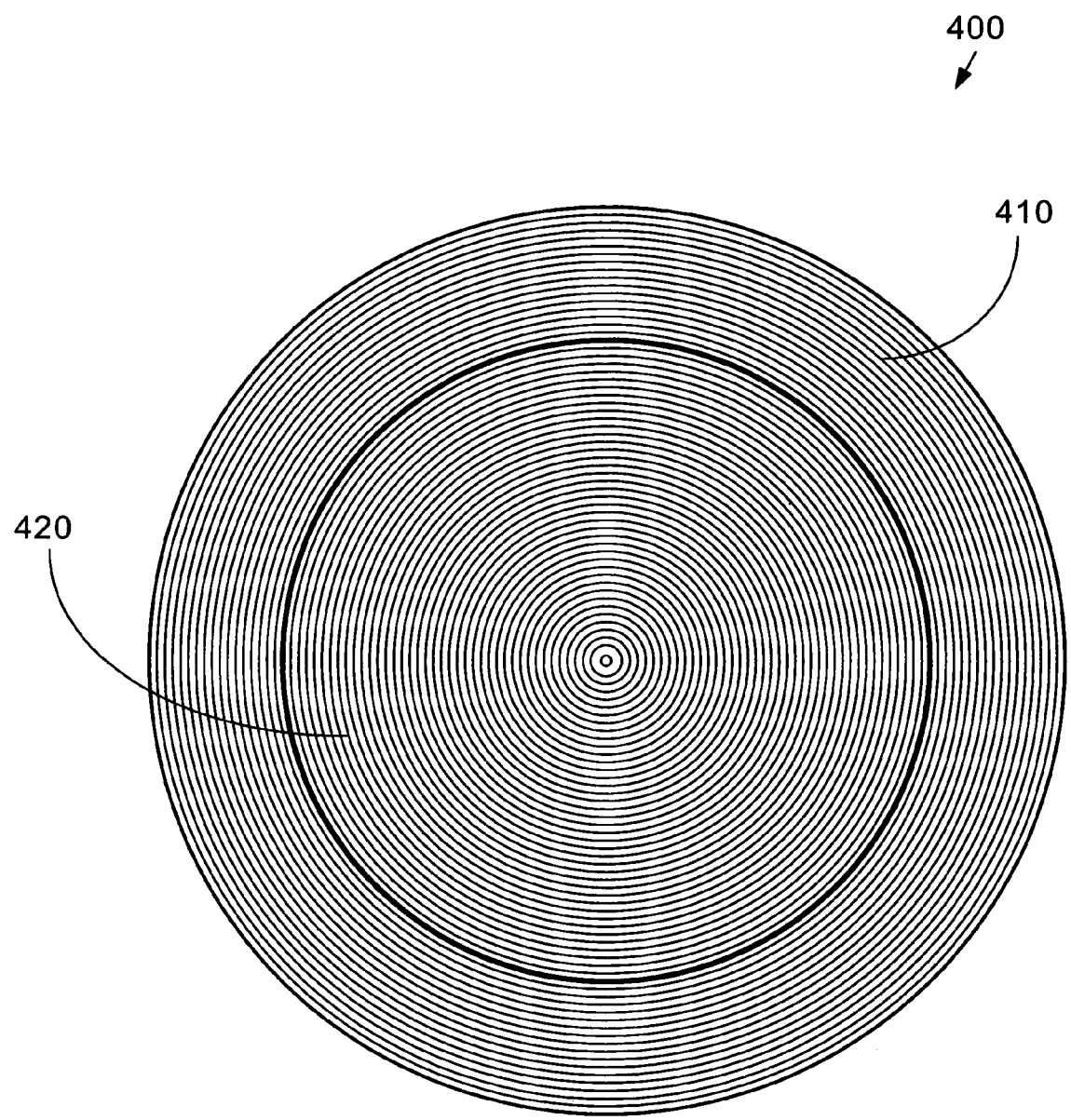
FIG. 4a illustrates a front view of a Fresnel lens having two zones each having a different groove angle.

FIG. 4*a* illustrates a front view of a Fresnel lens having two zones each having a different groove angle. The embodiment of FIG. 4*a* illustrates two zones with two groove angles; however, any number of zones with corresponding groove angles can be used. The groove angle of a lens can vary continuously. Also, while the example of FIG. 4*a* illustrates circular regions, other shapes can also be used.

In one embodiment, interior region 420 has grooves of approximately 35°; however, other groove angles can also be used. In one embodiment, outer region 410 has grooves of approximately 41°; however, other groove angles can also be used. In alternative embodiments, interior region 420 and outer region 410 can provide any combination of refraction and/or reflection lenses. In one embodiment, the projector side of lens 400 has grooves and the viewer side is planar. In an alternate embodiment, lens 400 has grooves on both sides.

Figure 4B:
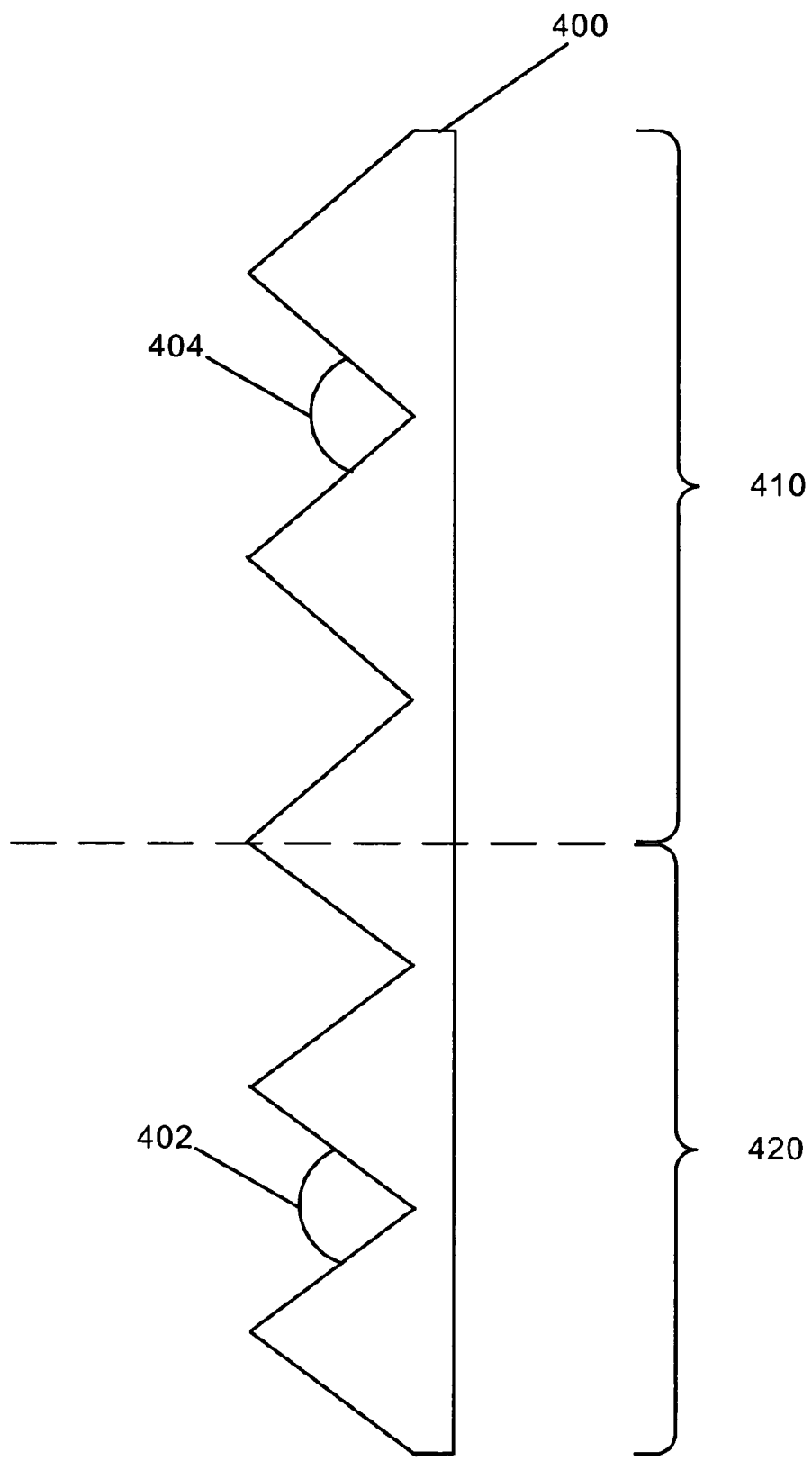
FIG. 4b illustrates a cross-sectional profile view of a two-zone Fresnel lens having a first zone with a groove angle of 35° and a second zone having a groove angle of 41°.

FIG. 4*b* illustrates a cross-sectional profile view of a two-zone Fresnel lens having a first zone with a groove angle 402 of 35° and a second zone having a groove angle 404 of 41°. The lens of FIG. 4*b* can be used with, for example, the display system of FIG. 2. The lens of FIG. 4*b* provides improved uniformity as compared to the lens of FIG. 3*b*.

In one embodiment, the grooves of zone 420 provide a refractive lens and the grooves of zone 410 provide a total internal reflection (TIR) lens. The refractive and reflective zones of lens 400 can be on the same side of the lens (e.g., the projector side) or the refractive and reflective zones of lens 400 can be on opposite sides (e.g., reflective on the projector side and refractive on the viewer side). As described in greater detail below, transition regions can be used to reduce or even eliminate image artifacts caused by transitions between zones. For a double-sided lens, two single-sided lenses can be aligned and the planar sides of each lens can be bonded together. Alternatively, one side of the lens can be manufactured, for example, by a curing process and additional grooves can be formed directly on the opposite side of the lens by the same process.

Figure 5:
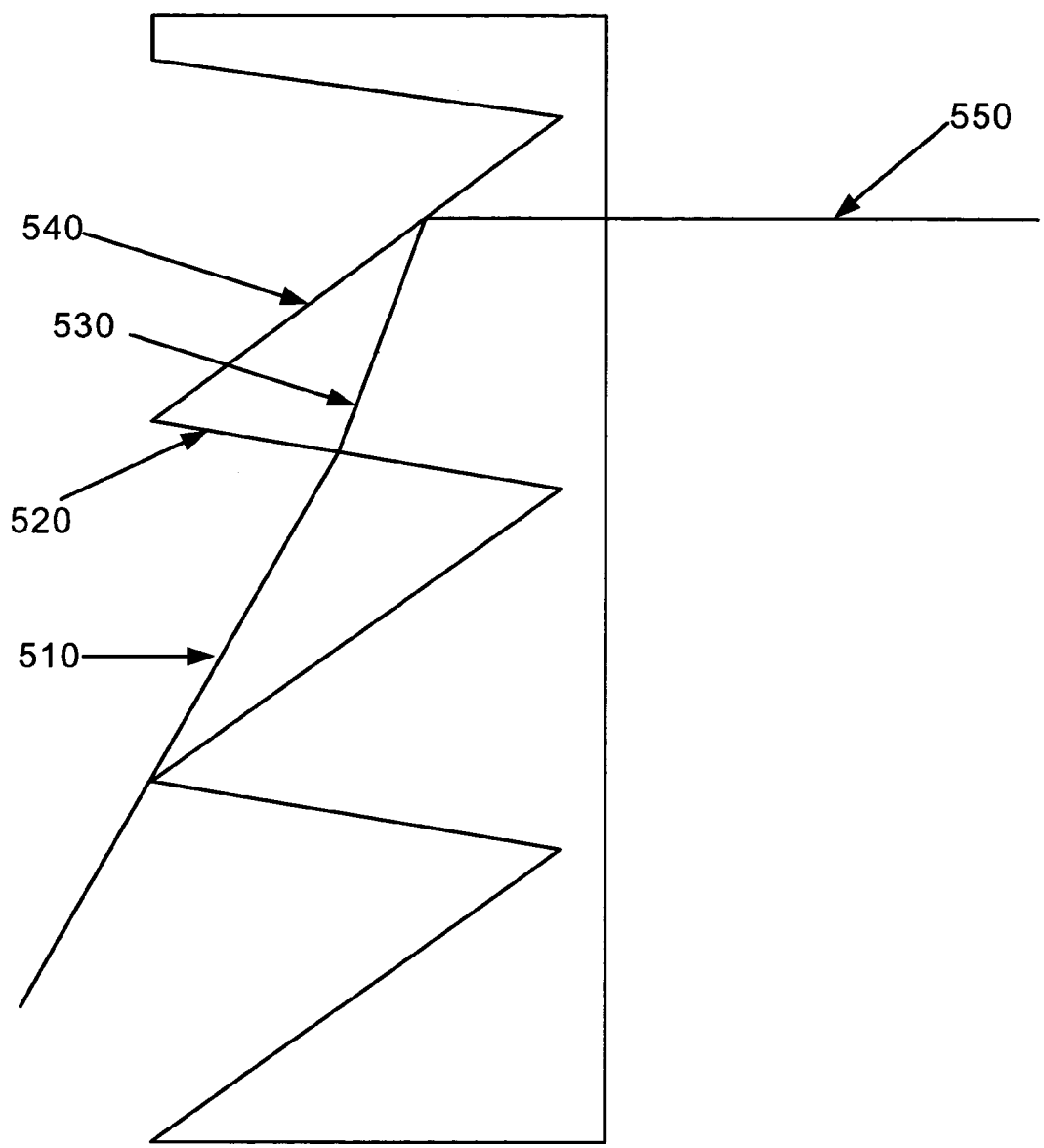
FIG. 5 illustrates an input ray having a 60° input angle with a Fresnel lens having a face angle of 10°.

FIG. 5 illustrates an input ray 510 having a 60° input angle with a Fresnel lens having a face angle of 10°. For steep angles of input light (e.g., greater than about 45°) it is possible to design face angles of the grooves such that all light enters the Fresnel lens and reflects off of reflection face and travels directly toward the viewer. For example, input light 510 passes through groove face 520 and is slightly refracted. Refracted light 530 is reflected by reflection face 540 toward a viewer (not shown in FIG. 5). For most applications, reflected light 550 is directed toward the viewer.

As the angle of the input light 510 decreases, there is an angle at which the refracted light misses reflection face 540. This occurs, for example, at the bottom center of the screen at the grooves closest to the Fresnel center. This light is lost and travels through the Fresnel structure creating either a ghost image or a reduction in contrast. The lost light reduces contrast at the bottom center of the screen area (and possibly everywhere depending on where the mirrors are with respect to the screen).

One technique to reduce ghost rays and improve contrast in these areas is to change the reflection face angle such that, instead of directing light toward the viewer, the lens is designed to collect as much light as possible. As a consequence, the reflected light ray 550 travels downward. This improves the contrast of the displayed image, but the downward light does not get redirected to viewer as well and appears dark.

The face angles can be designed so that light from the top corners of the screen, where the input rays are steep, is reflected slightly toward the center of the lens to improve perceived brightness at the corners of the image. An example of an embodiment of the invention in which light from the top corners of the screen is reflected toward the center of the lens is more fully described below with reference to FIG. 7, Table 1, Equation 1, Table 2, and FIG. 8.

Figure 6:
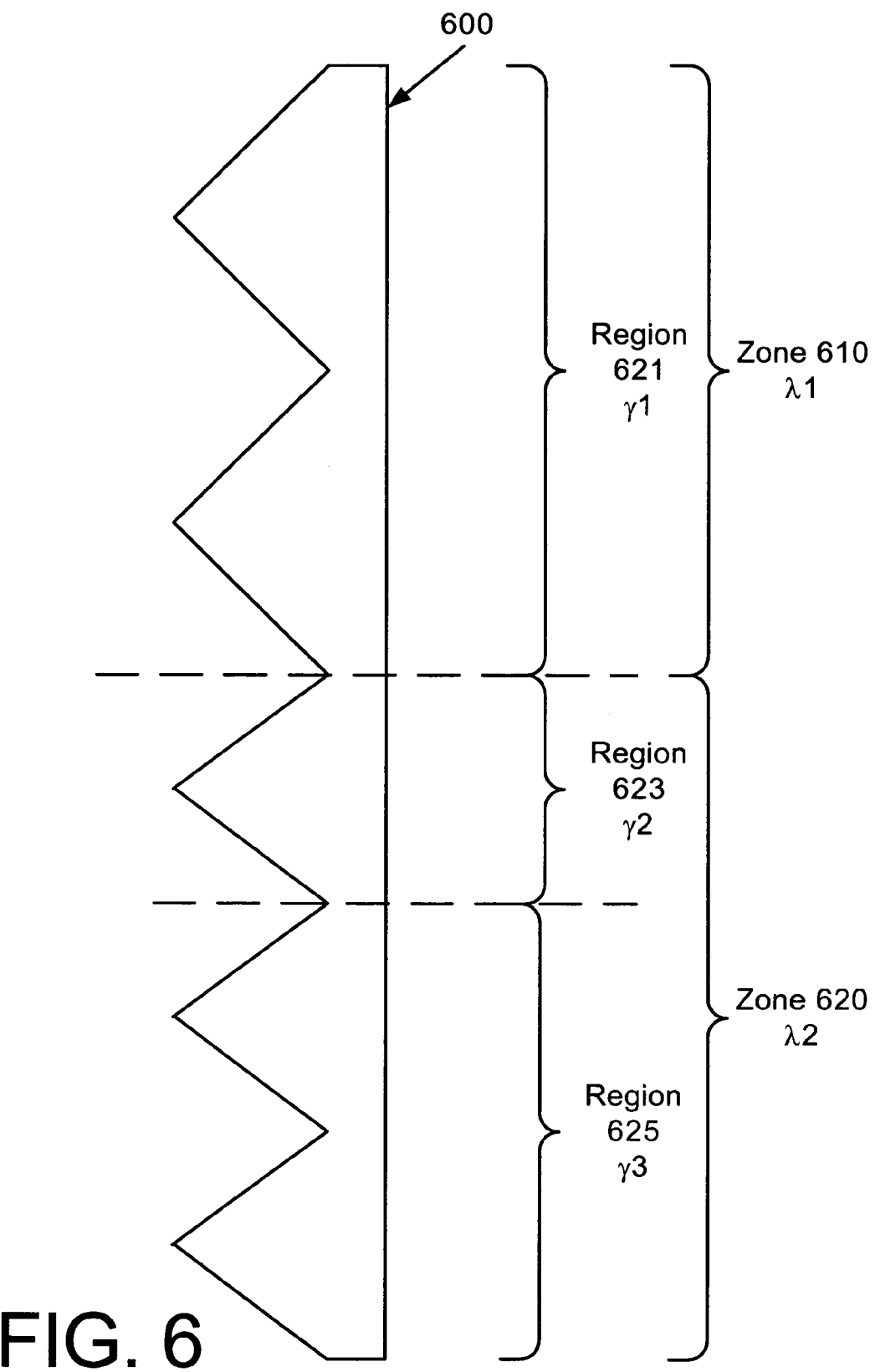
FIG. 6 illustrates a cross-sectional profile view of a Fresnel lens design having two zones with different groove angles and transition regions for the zones.

FIG. 6 illustrates a profile cross-section view of a Fresnel lens design having two zones 610, 620 with different groove angles and a transition region 623 between the zones. Lens 600 is illustrated with only a small number of grooves, zones and regions. This is for simplicity of description. A Fresnel lens can be used that has any number of grooves, zones, and/or regions.

As used herein, a "zone" is an area of a Fresnel lens having a particular groove angle (when the groove angle is not continuously variable). A "region" is an area of a Fresnel lens in which the face angle ($\gamma$) is defined by a single equation. A zone can include multiple regions, such as regions $\gamma 2$ 623 and $\gamma 3$ 625 in zone $\lambda 2$ 620. In one embodiment, one or more transition regions 623 are included at zone boundaries in order to provide a smooth zone transition.

In one embodiment, the equation, F, that defines the face angle, which can be a function of radius, r, for a first region and the equation, G, that defines the face angle for a second region, are equal at the region boundary. In other words, $F(r_1) = G(r_1)$ where $r_1$ is the region boundary. Further, the first derivative of the equation that defines the face angle for a region is equal to the first derivative of equation that defines the face angle at the region boundary. In other words, $F'(r_1) = G'(r_1)$ where $r_1$ is the region boundary. This requirement provides for a transition that is not seen because the change in face angle is smoothly continuous.

Figure 7:
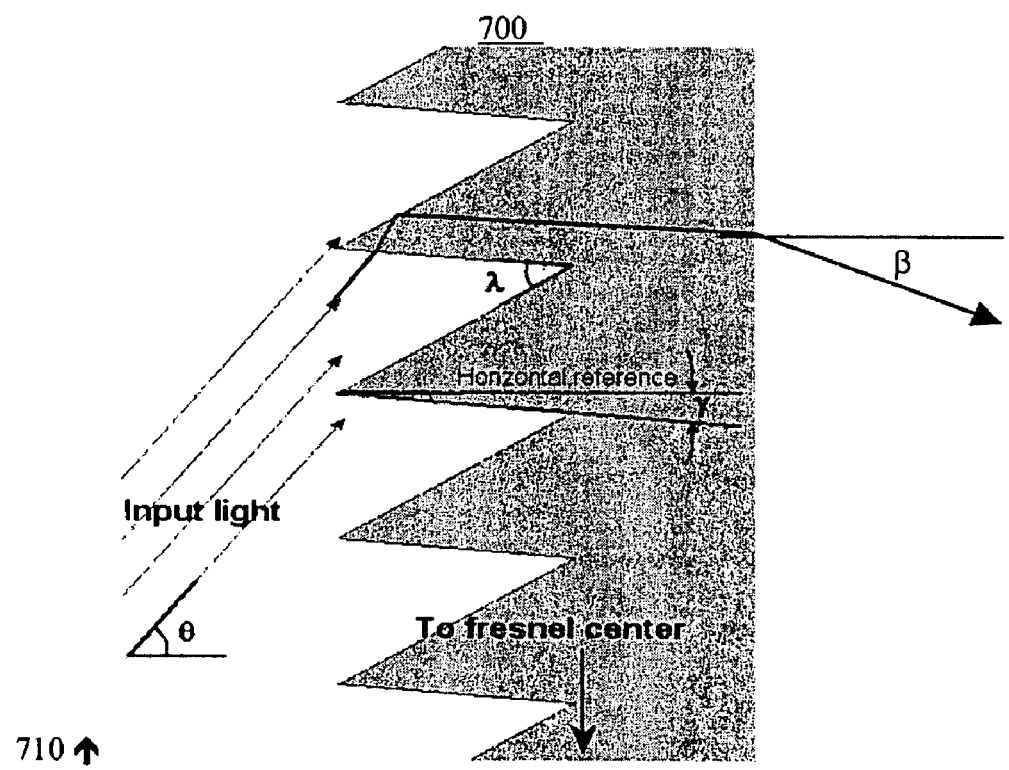
FIG. 7 illustrates the relationship between face angle ($\gamma$) and output ray angle ($\beta$), according to an embodiment of the invention.

FIG. 7 illustrates the relationship between face angle ($\gamma$) and output ray angle ($\beta$). As shown in FIG. 7, input light 710 reaches Fresnel lens 700 with an input ray angle theta ($\theta$). The groove angle for the illustrated zone of Fresnel lens 700 is shown by angle lambda ($\lambda$). As previously discussed in connection with FIG. 4*a* through FIG. 6, Fresnel lens 700 may have more than one zone and each zone may have a different groove angle. The various zones of Fresnel lens 700 may be defined by distances (R) from the center of the Fresnel lens (e.g., the center of Fresnel lens 700, shown in FIG. 4a). Table 1 provides a zone equation for the illustrated embodiment of a Fresnel lens. The zone equation expresses face angle (γ) in terms of the refraction angle, output ray angle (β), and groove angle (λ).

TABLE 1

| First zone | |
|---|---|
| Minimum radius | R = 245 |
| Maximum radius | R = 1230 |
| Zone equation | $\gamma = \tan^{-1}\left(\frac{n\sin\{\beta' + \lambda\} + \sin(\theta + \lambda)}{n\cos\{\beta' + \lambda\} - \cos(\theta + \lambda)}\right) + \lambda - \frac{\pi}{2}$ |
| Equation coefficients | n = 1.55 |
| | β' = sin⁻¹(sinβ/n) |
| Groove angle (λ) | 38° |

Equation 1 describes how output ray angle (β) varies with the radial distance R in an exemplary Fresnel lens. Equation 1 is expressed as a spline equation. Spline equations are well known to those of ordinary skill in the art.

$$\beta = \beta_1 + \sum_{k=1}^{4} \Delta_k \left[\left\{1 + \left(1 + \frac{R - R_0}{R_5 - R_0} - \frac{R_k - R_0}{R_5 - R_0}\right)^m\right\}^{\frac{1}{m}} - 1\right], \quad \text{Equation 1.}$$

where $$\Delta_1 = \frac{\beta_2 - \beta_1}{\frac{R_2 - R_0}{R_5 - R_0} - \frac{R_1 - R_0}{R_5 - R_0}}$$

and $$\Delta_k = \frac{\beta_{k+1} - \beta_k}{\frac{R_{k+1} - R_0}{R_5 - R_0} - \frac{R_k - R_0}{R_5 - R_0}} - \frac{\beta_k - \beta_{k-1}}{\frac{R_k - R_0}{R_5 - R_0} - \frac{R_{k-1} - R_0}{R_5 - R_0}}.$$

Table 2 provides the coefficients for equation 1 in an exemplary Fresnel lens where m is 16 and $R_0$ is 230 millimeters.

TABLE 2

| K | 1 | 2 | 3 | 4 | 5 |
|---|---|---|---|---|---|
| R [mm] | 260 | 300 | 650 | 950 | 1232 |
| β [°] | 0 | 0 | 0 | 5.5 | 8.5 |

Figure 8:
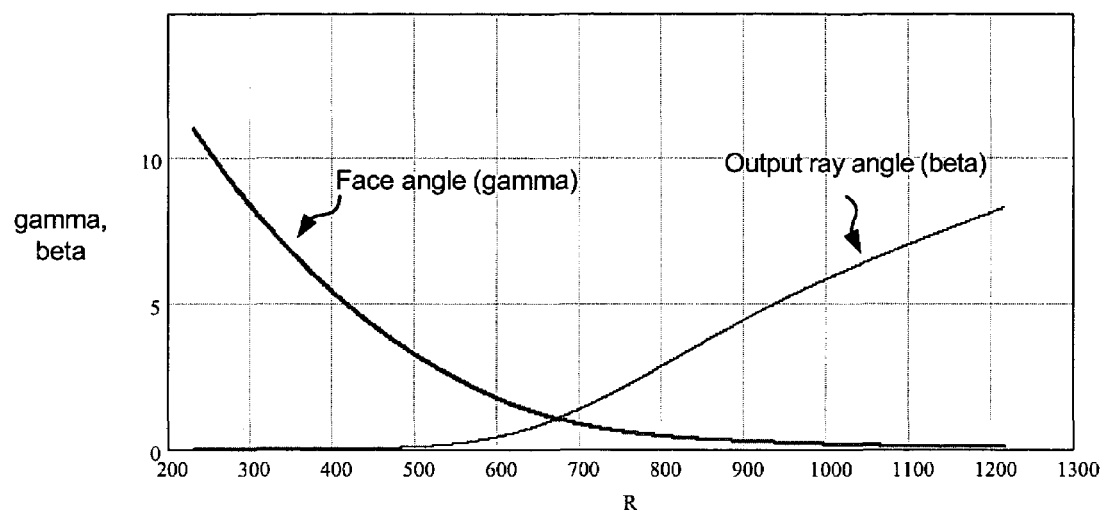
FIG. 8 provides an exemplary illustration of face angle ($\gamma$) and output ray angle ($\beta$) varying as a function of radial distance from the center of a Fresnel lens, according to an embodiment of the present disclosure.

FIG. 8 provides an exemplary illustration of face angle (γ) and output ray angle (β) varying as a function of radial distance (R) from the center of a Fresnel lens. As illustrated in FIG. 8, face angle (γ) is nonzero in a region close to the center of the Fresnel lens and approaches zero as the radial distance from the center of the Fresnel lens increases. In contrast, output ray angle (β) is nearly zero for small values of the radial distance R and increases as the value of R increases. Thus, in the illustrated Fresnel lens output ray angle (β) is substantially close to zero (e.g., +/−10°) for values of R corresponding to the center of the Fresnel lens and increases for values of R corresponding to the corners of the Fresnel lens. In alternative embodiments of a Fresnel lens, the relationships between face angle (γ), output ray angle (β), and radial distance from the center of a Fresnel lens (R) may be different than those illustrated in FIG. 8.

Fresnel lenses and diffusion screens that are used in screen of rear projection display devices such as those described above are often thin and flexible. As discussed previously, the thin screen materials can be clamped or otherwise joined to a mount to maintain their form. However, these conventional methods of positioning the Fresnel lens and diffusion screen in a display device can lead to image distortion, parallax, and other undesirable image characteristics.

Figure 9:
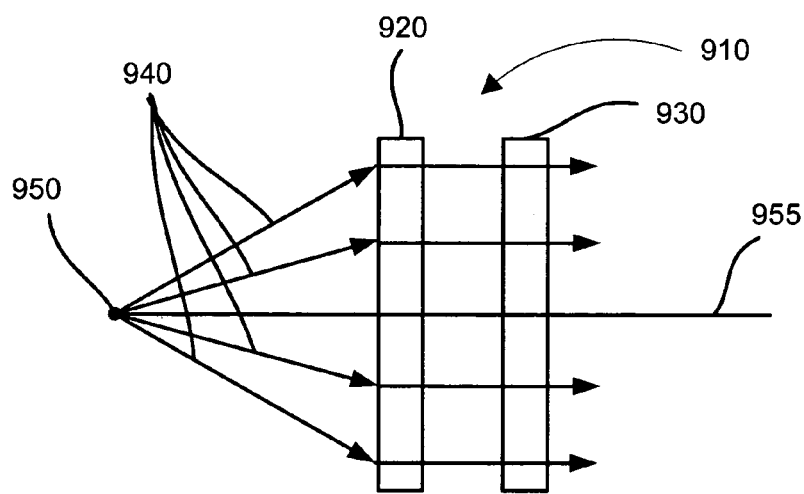
FIG. 9 illustrates a side view of an embodiment of the present invention where the diffusion screen and the Fresnel lens are maintained in a spaced relationship.

FIG. 9 illustrates an improvement on the conventional rear projection display devices wherein the screen 910 is illustrated as comprising a Fresnel lens 920 and a diffusion screen 930 maintained in a spaced relationship. FIG. 9 shows the light rays 940 as emanating from a single light source 950, such as a projector located on the viewing axis 955; however, other embodiments are within the scope of the present invention, such as the display device illustrated in FIG. 2. The light rays 940 leaving the light source (be it a single source such as projector 950 in FIG. 9 or a back plate mirror 220 in FIG. 2) approach the Fresnel lens 920 at various angles. The Fresnel lens 920 is configured to direct the light rays 940 toward a viewer. The specific dimensions and features of the Fresnel lenses and diffusion screens used in rear projection displays are dependent on many factors, some of which are discussed herein.

It has been discovered that by separating the Fresnel lens 920 from the diffusion screen 930, the rear projection display device of the present invention does not experience screen flex distortion caused by pressure on the diffusion screen 930. By separating the diffusion screen 930 from the Fresnel lens 920, the diffusion screen is able to serve as the outermost screen of a rear projection display device. Because the diffusion screen is the image plane as well as the outermost screen, there is no parallax. For example, the diffusion screen 930 may be configured as a touch screen or a writing pad in cooperation with the rear projection display device.

The Fresnel lens 920 and the diffusion screen 930 are operatively associated in a spaced relationship. The spaced relationship, or separation, between the Fresnel lens and the diffusion screen may be sufficient to prevent contact between the lens and the diffusion screen under a predetermined applied pressure. The amount of separation in a particular embodiment may depend on the desired use of the rear projection display device. For example, a device used as a writing pad may require more or less separation than a device used as a touch pad. Furthermore, the environment in which the device is used may demand more or less separation between the Fresnel lens 920 and the diffusion screen 930. For example, a rear projection display device used in an outdoor environment may require a greater degree of separation than a device used in an office or indoor environment.

FIG. 9 illustrates that the light rays exiting the Fresnel lens 920 are substantially parallel to the viewing axis 955 when they contact the diffusion screen 930. When the diffusion screen is implemented as the outermost surface of the screen 210, pressure applied to the diffusion screen is not transferred to the Fresnel lens 920, provided the applied pressure is less than the predetermined pressure threshold for the design conditions. Therefore, although the diffusion screen 930 may flex under the applied pressure, the light rays exiting the Fresnel lens remain parallel to the viewing axis 955. Accordingly, the image is not distorted by screen flex distortion under applied pressures to the diffusion screen.

Furthermore, in some embodiments, the separation of the Fresnel lens 920 and the diffusion screen 930 may reduce the parallax perceived by viewers. As discussed above, in some conventional rear projection display systems seeking to avoid screen flex distortion, an outer screen was implemented that was separated from the Fresnel lens and the diffusion screen, which were often disposed adjacent to one another. In this context, "adjacent" is used to indicate that the Fresnel lens and the diffusion screens were not maintained in a spaced relationship. The outer screen was utilized to protect the diffusion screen and Fresnel lens and may have additionally been used to enable the device to accept user inputs (i.e., the outer screen was configured to perform as a touch screen or writing pad). In these systems, parallax was caused by the image on the diffusion screen rather than on the outer screen. The resulting parallax was particularly problematic when the rear display device was configured to accept user inputs via the outer screen. In the present disclosure, separating the Fresnel lens 920 from the diffusion screen 930 in a spaced relationship, may result in reduction of perceived parallax, as well as, preventing the likelihood of induced screen flex distortion from applied pressure.

Figure 10:
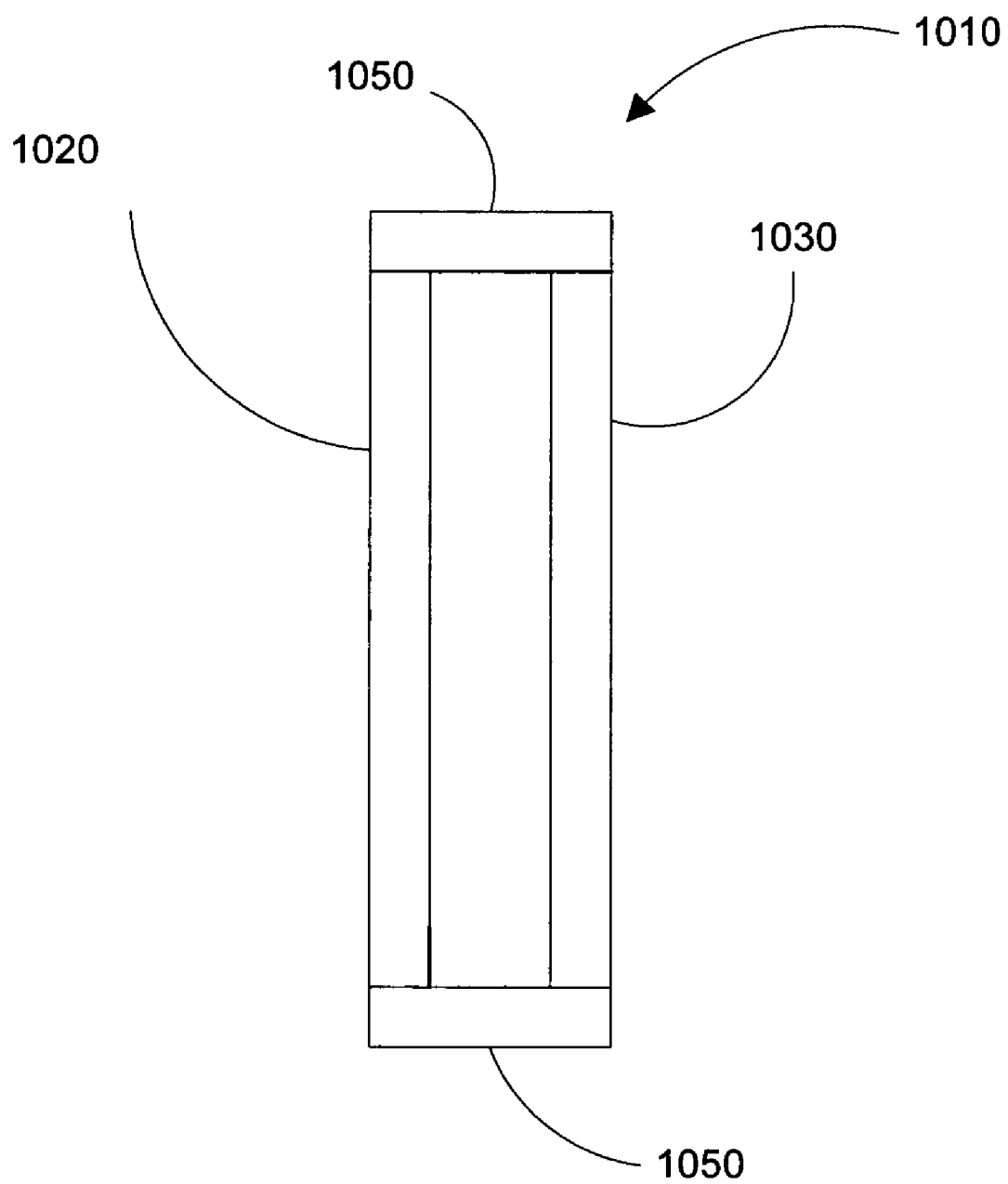
FIG. 10 illustrates a side view of a screen in accordance with the present disclosure.

FIG. 10 illustrates one embodiment of the present disclosure in which a screen 1010 is illustrated as comprising a Fresnel lens 1020 and a diffusion screen 1030. The spaced relationship between the diffusion screen 1030 and the Fresnel lens 1020 is maintained by mounting brackets 1050. One of ordinary skill in the art will recognize that there are many ways in which the Fresnel lens 1020 and the diffusion screen 1030 may be operatively associated in a spaced relationship. For example, the lens 1020 and the screen 1030 may each be independently mounted within a cabinet or other structural support. Alternatively, a mounting bracket 1050 may be utilized to maintain the lens 1020 and the screen 1030 in a spaced relationship, as shown in FIG. 10.

With reference to FIGS. 2 and 9, the spaced relationship between diffusion screen 930 and Fresnel lens 920 that comprise the screen 210, 910, respectively, results in a Fresnel lens 920 that is isolated from diffusion screen 930. As discussed above, Fresnel lenses and diffusion screens are typically made of thin, flexible material. The nature of these materials makes it difficult to maintain the screen in the desired vertical and flat orientation for preferred imaging and viewing results.

The vertical and flat orientation of the Fresnel lens and diffusion screen may be obtained by applying tension across the screen. However, mounting brackets, when secured to discrete points of the Fresnel lens or diffusion screen result in localized pockets of increased stress concentration.

It should be noted that the Fresnel lens and diffusion screen may be mounted and initially installed with uniform tension. Over time, however, portions of the screen, such as the center of the lens, experience relaxation, while other portions, such as regions near the mounting brackets, experience an increase in tension. This pattern of tension redistribution may be undesirable because it alters the properties and angles of the Fresnel lens and causing image distortion.

To prevent such tension redistribution, the screen may include a lens portion and a frame portion. Additionally, a tensioner or tensioning mechanism may be operatively associated with the screen to adjust the frame portion in order to maintain a predetermined tautness in the lens portion. In some embodiments, the tensioner may engage the frame portion and expand the frame such that the lens portion is held at a predetermined tension and/or a predetermined flatness.

Figure 11:
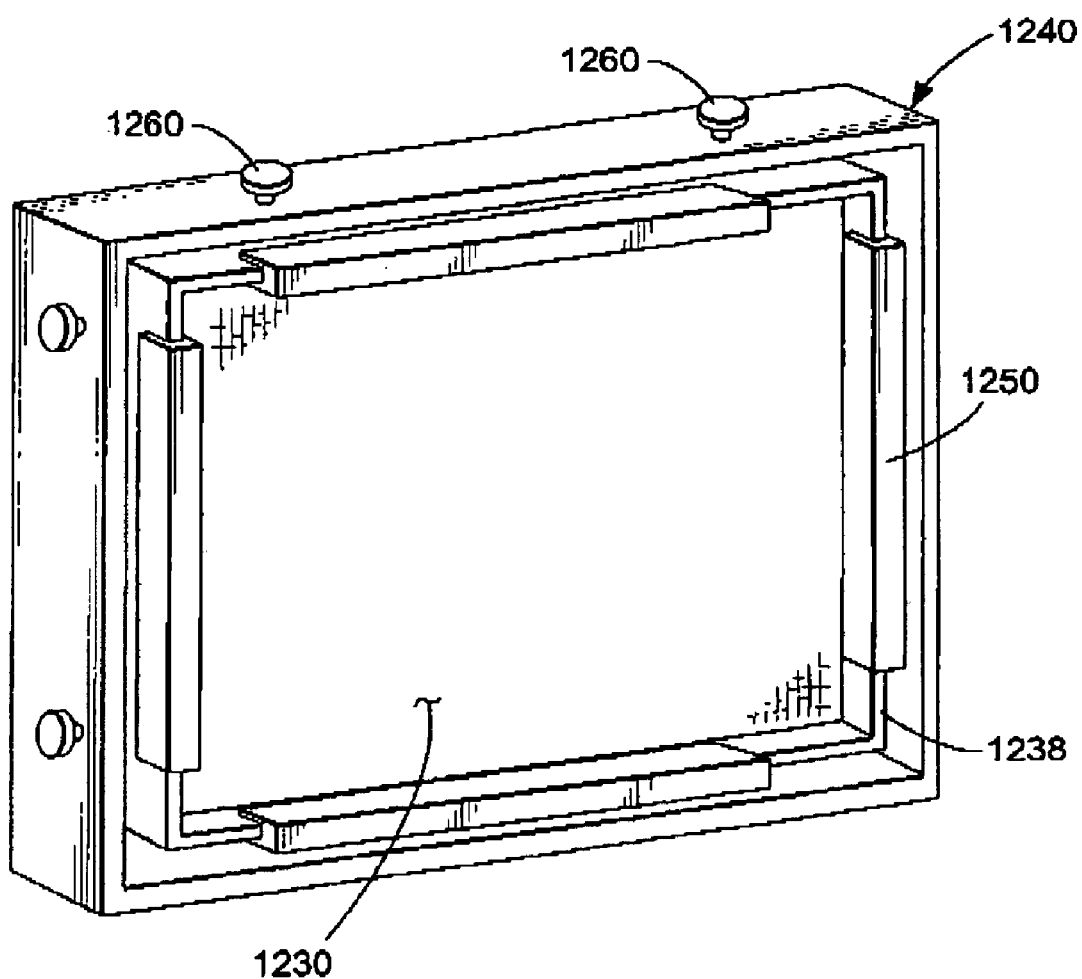
FIG. 11 illustrates a perspective view of an embodiment of a screen according to the present disclosure.
Figure 11A:
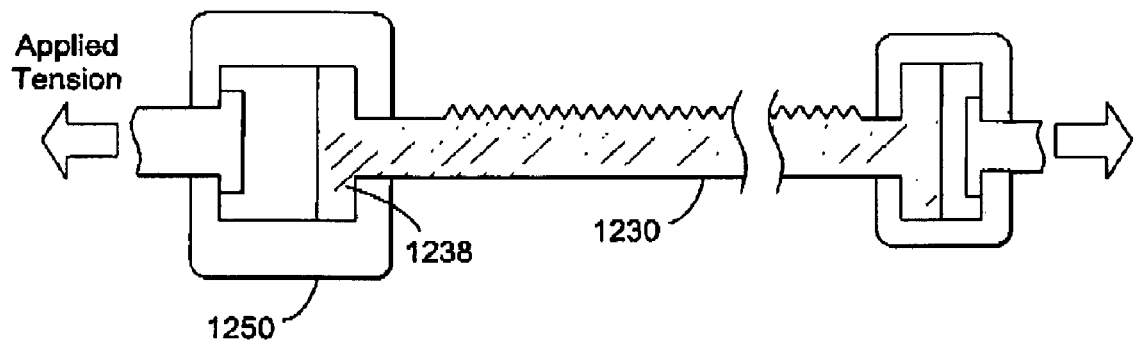
FIG. 11A illustrates a cross sectional view of a screen and integral rib.

FIG. 11 illustrates a screen 1230 mounted in an outer frame 1240, a cabinet or other structural support apparatus. In conventional rear projection display devices, this mounting contributed to localized stress pockets that resulted in image distortion and screen failure. Screens configured with a lens portion and a frame portion, provide a coupling means that is able to distribute the stresses from the mounting process throughout the screen. For example, when the frame portion is operatively associated with an external tensioner, the tensioner may be mounted to the outer frame while being configured to maintain the predetermined tautness in the lens portion. As shown In FIG. 11A, the tension applied by the tensioner (applied tension) may be substantially parallel to the screen. Thus, the tensioner stretches the screen to a predetermined tautness. As shown in FIG. 11, screen 1230 comprises integral rib 1238 that provides a place for the mounting hardware 1250 to attach to the screen. The mounting hardware 1250 is coupled to a tensioner, such as tensioning knobs 1260, that is coupled to outer frame 1240.

Figure 11B:
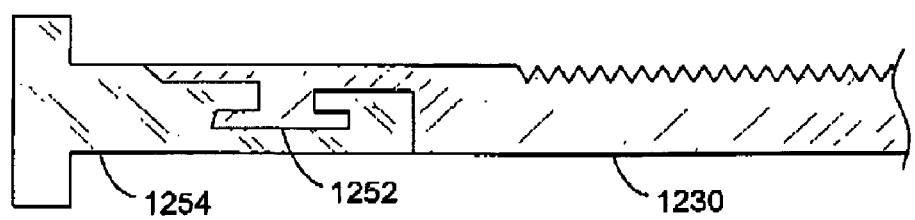
FIG. 11B illustrates a cross sectional view of a screen with an integral frame portion comprising an integral component and a mounting component.

A cross sectional view of one embodiment of screen 1230 with integral rib 1238 is shown in FIG. 11A. Alternatively, the frame portion itself may provide means for coupling the screen to the cabinet or other support structure. This may be accomplished by molding or casting the screen around a frame portion that includes a first component integrated into the screen and a second component extending away from the screen that provides mounting hardware to couple with a tensioner. FIG. 11B illustrates a cross sectional view of one embodiment screen 1230 integrally molded to a frame portion that comprises an integrated component 1252 and a mounting component 1254.

Figure 12:
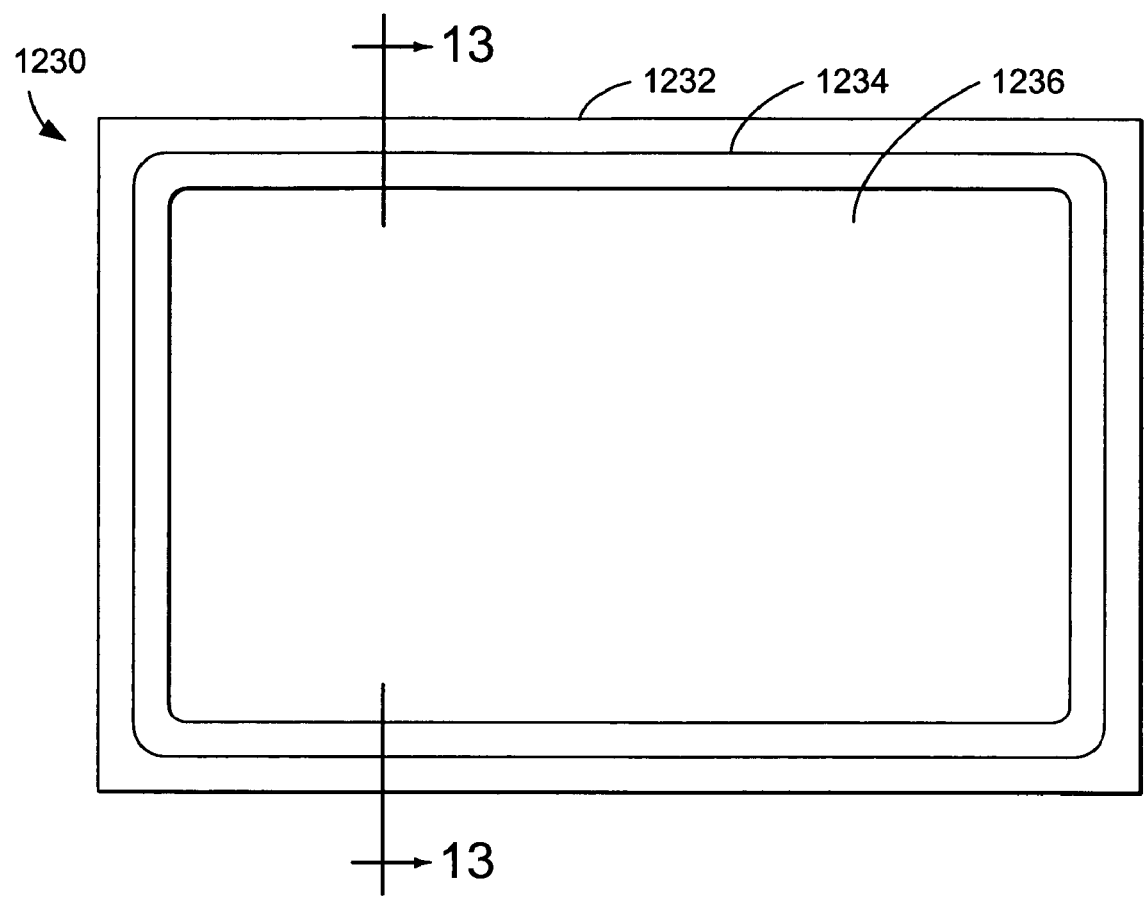
FIG. 12 illustrates a front view of a screen in accordance with the present disclosure.

FIG. 12 illustrates a screen 1230 in accordance with the present invention. Screen 1230 is defined by an outer perimeter 1232 and includes a frame portion 1234, disposed inwardly from the outer perimeter 1232, and a lens portion 1236. The lens portion 1236 may be circumscribed by the frame portion 1234 or it may extend beyond the frame portion to the outer perimeter 1232.

Figure 13:
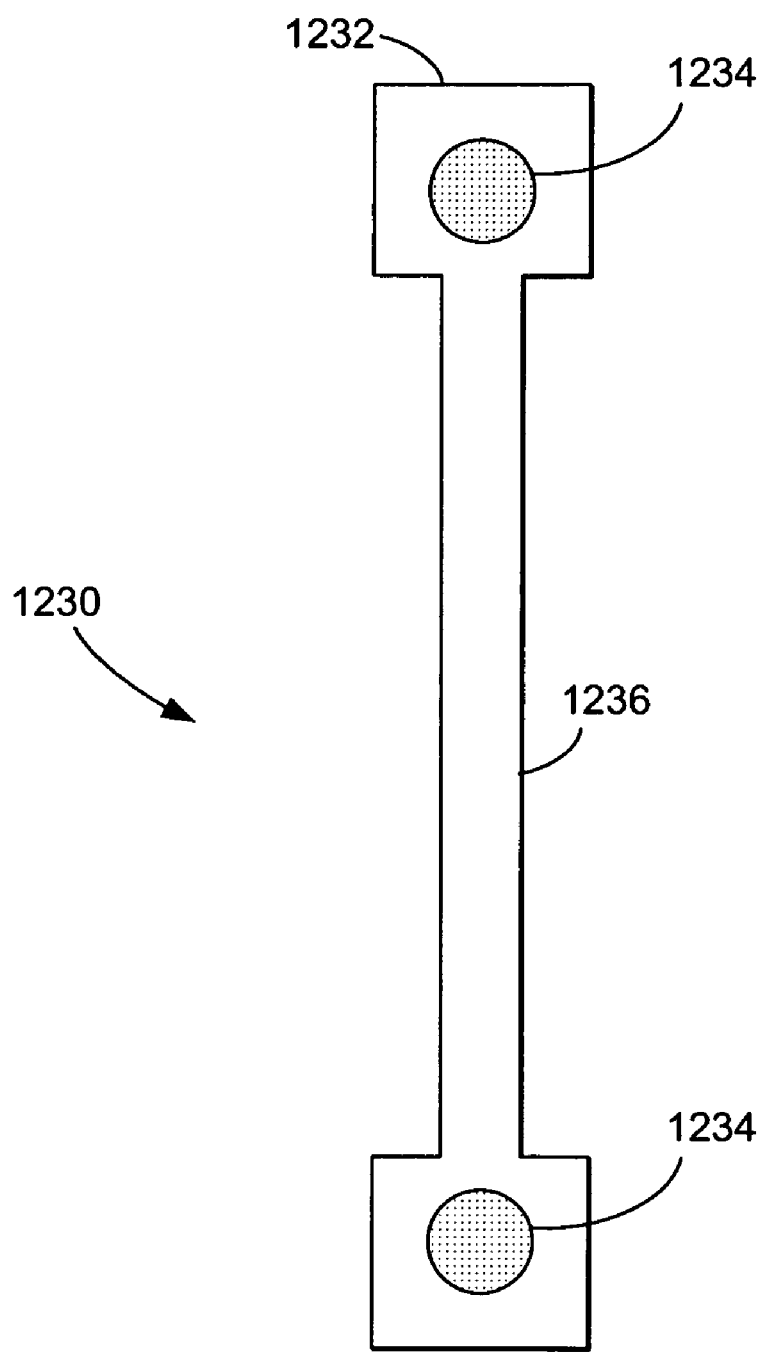
FIG. 13 illustrates a side view of the screen of FIG. 12.

FIG. 13 shows a cross-sectional view of screen 1230 of FIG. 12 along line 13—13. As can be seen in FIG. 13, frame portion 1234 and lens portion 1236 may be integrated. It is to be understood that integrated may include the configuration where the frame portion and the lens portion form a single component with the frame portion as an integral part of screen 1230. For example, the frame portion can be embedded within the material that comprises the screen 1230. Alternatively, the frame portion can be secured to the exterior surface of the lens portion, either with adhesives or other known joining methods. The frame portion may be disposed next to the exterior surface of the lens portion or there may be intermediate members between the lens portion and the frame portion.

In one embodiment, screen 1230 may be a Fresnel lens. Alternatively, screen 1230 may be a diffusion screen or other screen materials used in a rear projection display device. Frame portion 1234 may be constructed of a material of greater rigidity than that of the lens portion in order to provide structural support to the lens portion. Additionally, the frame portion may be transparent such that light rays may pass through without the frame portion without substantial interference. For example, the frame portion may be plastic, acrylic plastic, glass, or other suitable material.

FIGS. 12 and 13 illustrate a frame portion 1234 integrally formed around the perimeter of the lens portion 1236. It is to be understood that in this configuration, the frame portion may be disposed on the lens portion, as the outer perimeter 1232, or adjacent to the outer perimeter 1232, as shown in the figures. The frame may be integrated around the screen during the screen forming process. For example, the frame and screen may be produced using an insert molding process, a cast and cure process, or any other process that results in the frame being interlocked with the screen. The integral nature of the frame portion enables easy attachment of one or more tensioners to generate uniform tensioning across the screen. Such a configuration prevents the necessity of using fasteners which causes stress concentrations, such as mounting holes or point contact clamping mechanisms.

The frame portion of screen 1230 may be provided in different configurations. For example, the frame portion may comprise crossing frame portions such as diagonally crossing members. Alternatively, a plurality of frame members may be used that span the lens portion vertically and horizontally in a checkerboard-like manner.

The individual frame members may be formed in a variety of shapes to conform to the design requirements of the screen. For example, the frame members may be thin slats that do not increase the thickness of the screen they are supporting. Alternatively, the frame members may be configured as ribs that increase the thickness of the screen at least in the regions of the screen adjacent to the frame member. The rib configuration may be preferred when the frame portion is adjacent to the outer perimeter of the screen or when the frame portion serves as the outer perimeter of the screen.

Ribs or other supports may be integral with the screen. The rib features may be manufactured as part of the screen by any suitable molding or casting process for the screen. The shape of the rib may be such that the tensioner may be easily attached to the rib.

As described above, the screen includes a lens portion and a frame portion that may be configured to provide some structural support to the lens portion. It is to be understood that the frame portion need not provide all of the structural support to the screen, as the screen will generally be disposed within a cabinet or other structural support. A tensioner may be operatively associated with the frame portion and lens portion such that the tensioner is configured to adjust the frame portion to maintain a predetermined tautness in the lens portion. The frame portion may also be configured to provide a plurality of attachment points whereby the frame portion can be secured to a cabinet or other suitable structural support in which the screen is housed, if such a cabinet or structural support is used. When the screen is secured to the cabinet or other structural support via the frame portion, the stress of the attachment points is distributed over the entire screen to minimize any localized stresses.

The screen and the tensioner may be associated in a number of ways whereby the tensioner is adapted to maintain the predetermined tautness in the lens portion. For example, the frame portion may be configured to provide a plurality of attachment points to which the tensioner may be coupled. The tensioner may be an adjustable screw mechanism, turnbuckle mechanism, spring loaded screw mechanism, and other mechanisms known in the art.

In some configurations, the frame portion may comprise two or more frame members that are movable in relation to each other. For example, frame portion 1234 may comprise four right angle frame members, one at each corner of the screen's perimeter. Each frame member may be movably coupled to the adjacent members allowing the tensioner to move the members as required to maintain the predetermined tautness. Similar relationships can be implemented for the variety of frame configurations. Alternatively, the frame portion 1234 may comprise a plurality of linear frame members associated with the tensioner. Depending on the configuration of the tensioner and the frame members, each of the frame members may be coupled to adjacent members, may be movable coupled to adjacent members, or may be independent of adjacent members. One of skill in the art will recognize the plurality of ways the frame portion may be constructed to enable the tensioner to maintain tension on the screen.

Various systems and methods may be provided for monitoring the tension in the screen, communicating the observed tautness to the tensioner, and adjusting the tensioner to return the screen tension to the predetermined tautness if necessary. For example, a sensor may be used to measure the tautness of the screen at a predetermined location. Feedback from the sensor may be communicated via a processor to a tensioner which may automatically adjust the tension of the screen. For instance, strain gauges can be mounted in strategic locations on the surface of the screen which provide feedback to a system that can actuate appropriate stepper motors to increase or decrease the load in screw based tensioners. Similar systems known in the art can be implemented depending on the configuration of the tensioner implemented.

In some embodiments, the tensioner may be an integral part of the frame portion and may be adjustable without the use of external detectors. One embodiment of an integral tensioner would be pre-loaded, such as spring-loaded, frame members that are outwardly biased to apply tension to the screen. Other means of biasing the frame members to apply tension to the screen will be recognized as within the scope of the present invention by those of ordinary skill in the art.

While the frame portion 1234 of the screen 1230 has been discussed in relation to the tensioner and in relation to a mounting cabinet or support structure, it may also be adapted to couple the screen with other nearby elements. For example, the screen of FIG. 12 may serve as the Fresnel lens 920 of FIG. 9. In this aspect of the invention, the frame portion may be configured to couple the Fresnel lens 920 to the diffusion screen 930. Additionally, the frame portion may be configured to maintain the spaced relationship between the diffusion screen and the Fresnel lens. In an alternative aspect of this invention, mounting brackets, such as mounting bracket 1050 in FIG. 10, may be used to maintain the desired spaced relationship while the frame portion provides the coupling means whereby the screen is coupled with the mounting brackets.

Figure 14:
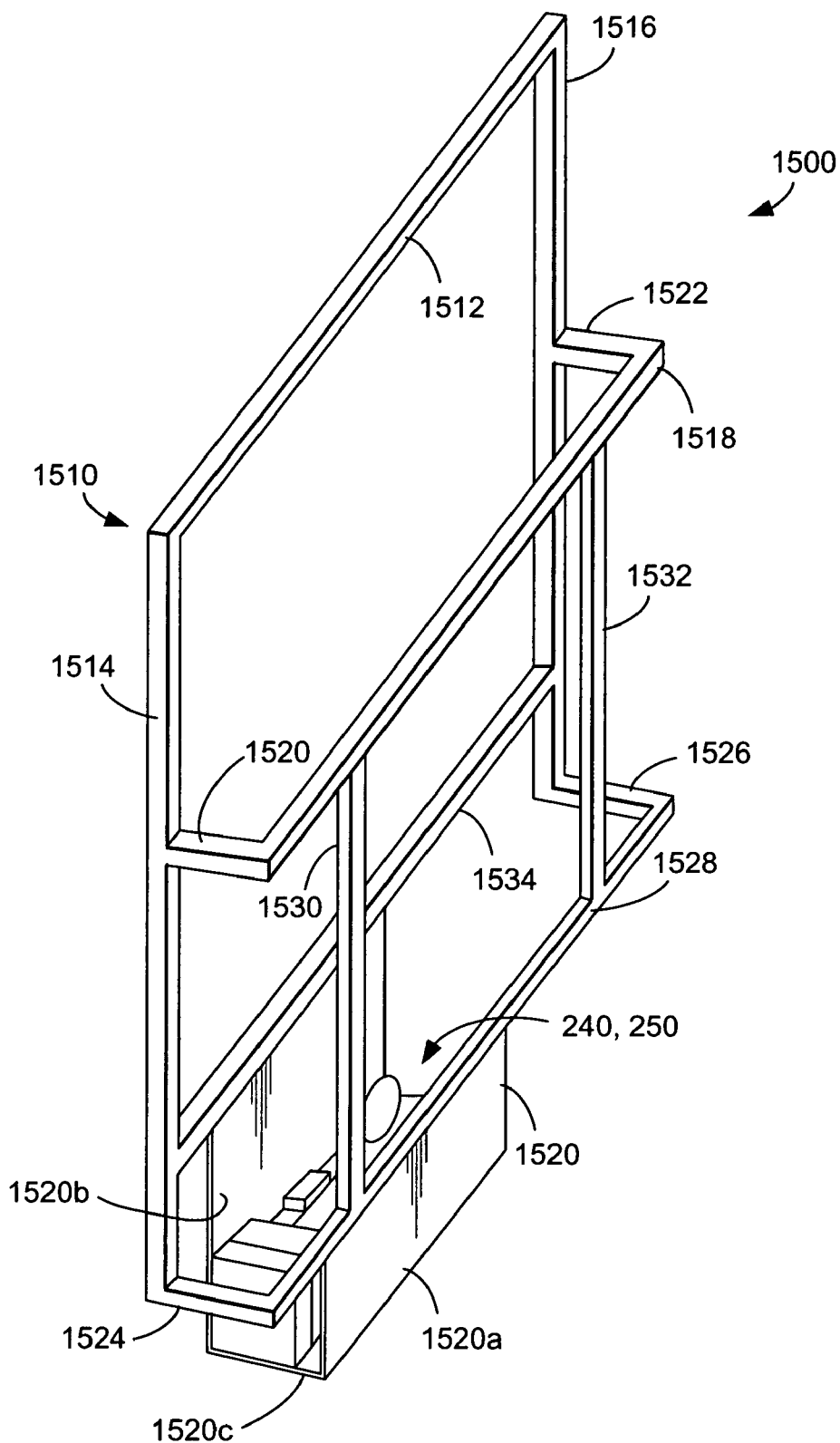
FIG. 14 illustrates a structural frame assembly in which the present disclosure may be incorporated.

Referring now to FIG. 14, an exemplary structural frame assembly 1500 is shown in a three-dimensional view, along with a lens system 240 and a DMD 250. Note that the positioning of lens system 240 and DMD 250 in the bottom forward portion of the assembly 1500 is an example position, which advantageously utilizes the positioning of the mirrors 220 and 230 (not shown in FIG. 14). However, alternative positions and orientations could also be used.

Continuing with FIG. 14, structural frame assembly 1500 has lower case region 1520 made from aluminum sheet metal, or a polymeric material. Lower case region 1520 has two vertical planes (1520a and 1520b) and a horizontal plane (1520c). The lower case region 1520 is coupled to the bar frame 1510, which utilizes four horizontal members parallel to the screen (1512, 1518, 1534, and 1528, screen not shown), four vertical members (1514, 1516, 1530, and 1532), and four horizontal members perpendicular to the screen (1520, 1522, 1524, and 1526, screen not shown).

Figure 14A:
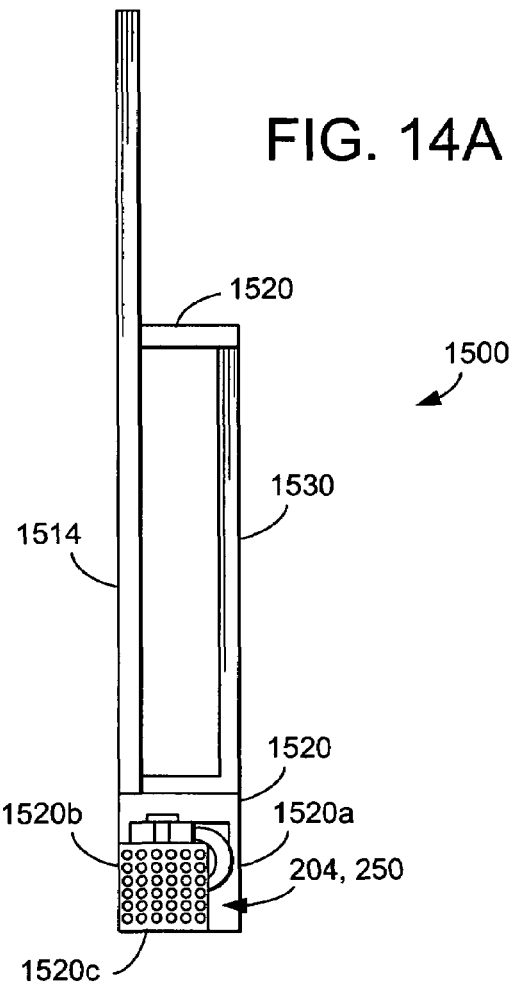
FIG. 14a illustrates a side view of the assembly shown in FIG. 14.
Figure 14B:
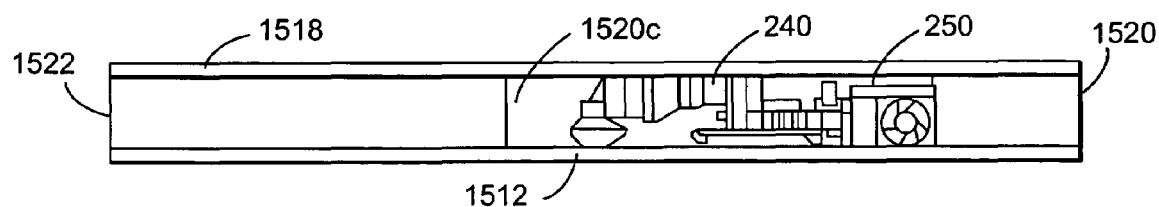
FIG. 14b illustrates a top view of the assembly shown in FIG. 14.

A side view of structural frame assembly 1500 is shown in FIG. 14a and a top view of structural frame assembly 1500 is shown in FIG. 14b. It should be recognized that screen 1230 and frame portions 1234 of the present disclosure may be implemented in a variety of assemblies, including the structural frame assembly 1500 shown in FIGS. 14, 14a, and 14b.

It should be appreciated that although the above screen and frame are described in regards to use with a rear projection device, the screen may be implemented in other systems, such as a front projection display device without departing from the scope of the invention.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

We claim:

1. A display device for displaying images in a rear projection display device, comprising:
   a screen comprising a lens portion and a frame portion; and
   a tensioner operatively associated with the screen adapted to selectively adjust the frame portion to maintain a predetermined tautness in the lens portion wherein tension is applied substantially parallel to the screen to minimize localized stress.

2. The display device of claim 1, wherein the frame portion and the lens portion are integrated.

3. The display device of claim 2, wherein the frame portion is integrally formed around the perimeter of the lens portion.

4. The display device of claim 2, wherein the tensioner is configured to automatically adjust tension of the screen based on feedback from the sensor.

5. The display device of claim 1, wherein the screen is a Fresnel lens.

6. The display device of claim 5, wherein the frame portion is a rib.

7. The display device of claim 6, wherein the rib is integrally formed around an outermost perimeter of the lens portion.

8. The display device of claim 5, wherein the frame is configured to couple the screen to a diffusion screen.

9. The display device of claim 1, wherein the tensioner is configured to maintain a uniform tautness in the lens portion.

10. The display device of claim 1, further comprising a sensor to monitor the tension in the screen.

11. A screen for use in a rear projection display device, comprising
   a lens portion; and
   a frame portion, wherein the frame portion and the lens portion are integrated where one of the lens portion and the frame portion is embedded in the other of the lens portion and the frame portion.

12. The screen of claim 11, wherein the screen includes a Fresnel lens.

13. The screen of claim 11, wherein the frame portion is a rib.

14. The screen of claim 13, wherein the rib is integrally formed around the perimeter of the lens.

15. The screen of claim 11, wherein the frame portion is configured to maintain a predetermined tautness in the lens portion.

16. The screen of claim 15, wherein the frame portion is configured to maintain a uniform tautness in the lens portion.

17. A rear projection display device comprising:
   an imaging device;
   a wide angle lens system to project an image from the imaging device;
   a screen comprising a lens portion and a frame portion;
   a mirror assembly to reflect the images projected from the lens system onto the screen, wherein the frame portion and the lens portion are integrated; and
   a tensioner operatively associated with the screen adapted to selectively adjust the frame portion to maintain a predetermined tautness in the lens portion, wherein the tension applied by the tensioner is substantially parallel to the screen.

18. The display device of claim 17, wherein the screen is a Fresnel lens.

19. The display device of claim 17, wherein the frame protion is a rib.

20. The display device of claim 19, wherein the rib is integrally formed around the perimeter of the lens portion.

21. The screen of claim 17, wherein the frame portion is configured to maintain a uniform tautness in the lens portion.

* * * * *